(12) United States Patent
Hussein et al.

(10) Patent No.: US 7,414,335 B2
(45) Date of Patent: Aug. 19, 2008

(54) INRUSH CURRENT CONTROLLER

(75) Inventors: Hakam D. Hussein, Eagan, MN (US); Wendong Zhang Zhang, Eden Prairie, MN (US)

(73) Assignee: Seagate Technology, Scotts Valley, CA (US)

( * ) Notice: Subject to any disclaimer, the term of this patent is extended or adjusted under 35 U.S.C. 154(b) by 515 days.

(21) Appl. No.: 10/824,866

(22) Filed: Apr. 15, 2004

(65) Prior Publication Data

US 2005/0231874 A1    Oct. 20, 2005

(51) Int. Cl.
G06F 13/00 (2006.01)
H01H 9/30 (2006.01)

(52) U.S. Cl. .................................. 307/135; 710/302
(58) Field of Classification Search ................ 307/135, 307/130; 361/100; 710/302
See application file for complete search history.

(56) References Cited

U.S. PATENT DOCUMENTS

| | | | |
|---|---|---|---|
| 4,943,762 A | 7/1990 | Campbell | |
| 4,999,728 A | 3/1991 | Curl | |
| 5,519,264 A | 5/1996 | Heyden | |
| 5,559,660 A * | 9/1996 | Watson et al. ................ | 361/58 |
| 5,694,305 A | 12/1997 | King | |
| 6,185,645 B1 | 2/2001 | Klein | |
| 6,225,797 B1 * | 5/2001 | Willis et al. .................. | 323/351 |
| 6,233,625 B1 | 5/2001 | Kamp | |
| 6,262,493 B1 | 7/2001 | Garnett | |
| 6,408,394 B1 | 6/2002 | Kamp et al. | |
| 6,525,515 B1 * | 2/2003 | Ngo et al. .................... | 323/277 |
| 6,643,087 B1 | 11/2003 | Kuroki | |
| 6,917,504 B2 * | 7/2005 | Nguyen et al. ............... | 361/100 |
| 6,949,961 B2 * | 9/2005 | Robb et al. ................... | 327/52 |
| 2003/0056125 A1 | 3/2003 | O'Conner | |
| 2004/0012263 A1 | 1/2004 | Hussein | |
| 2006/0250738 A1 * | 11/2006 | Hussein et al. ............. | 361/93.1 |

* cited by examiner

*Primary Examiner*—Michael J Sherry
*Assistant Examiner*—Michael Rutland Wallis
(74) *Attorney, Agent, or Firm*—Westman, Champlin & Kelly, P.A.

(57) ABSTRACT

An inrush current controller for a device has a connector for hot-plugging the device into a source of energization. An impedance has a current input coupled to a first contact of the connector and a current output coupled to the device. The impedance has an impedance control input. An impedance control circuit has a logic input coupling to a second contact of the connector. The impedance control circuit has an impedance control output connected to the impedance control input. The impedance control output forces the impedance OFF during a first time interval after hot-plugging. The logic input triggers a limited inrush at the current input after the first time interval.

25 Claims, 9 Drawing Sheets

INRUSH CURRENT CONTROLLER

FIELD OF THE INVENTION

The present invention relates generally to inrush current controllers for hot plugging devices into host systems, and more particularly but not by limitation to hot plugging memory storage devices into host computer systems.

BACKGROUND OF THE INVENTION

Various kinds of computer systems are arranged to provide for physical insertion and removal of one or more disc drives while the computer system is energized and running. When the computer system power supply contacts mate with the disc drive power supply contacts there can be a current surge that adversely affects the operation of the computer system, the disc drive or both.

Various types of circuits are known to reduce these current surges. However, these known circuits tend to be complex, expensive or unpredictable. A method and apparatus are needed that will provide a low cost, predictable startup with a limited inrush of current.

Embodiments of the present invention provide solutions to these and other problems, and offer other advantages over the prior art.

SUMMARY OF THE INVENTION

Disclosed is an inrush current controller for a device. The inrush current controller comprises a connector for hot-plugging the device into a source of energization. The inrush current controller also comprises an impedance. The impedance has a current input that couples to a first contact of the connector. The impedance has a current output that couples to the device, and an impedance control input.

The inrush current controller also comprises an impedance control circuit. The impedance control circuit has a logic input coupling to a second contact of the connector. The impedance control circuit has an impedance control output connected to the impedance control input. The impedance control output forces the impedance OFF during a first time interval after hot-plugging. The logic input triggers a limited inrush at the current input after the first time interval.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, an inrush current controller for a device has a connector for hot-plugging the device into a source of energization provided by a host system. A variable impedance controls flow of inrush current from the hot plug connector to the device. The hot plug connector couples a logic output from a host system to a logic input on an impedance control circuit. The impedance control circuit has an impedance control output connected to an impedance control input. The impedance control output forces the impedance OFF during a first time interval after hot-plugging. The logic input triggers a limited inrush at the current input after the first time interval.

The impedance control circuit ensures that energization is not applied to the device while the hot plug connector is in the process of being mated with the host system. The impedance control circuit also ensures that the energization of the device is controllable by the host system when the host system provides a logic output to the logic input. Energization of the device can be controlled by the host system to occur in a controlled, repeatable time and voltage sequence defined by the impedance control circuit.

In a preferred arrangement, the inrush current controller comprises low cost, reliable discrete components (resistors, capacitors, diodes, transistors), thus avoiding the higher cost and unpredictable startup of integrated circuits. There is no need for a charge pump (voltage multiplier) to provide a higher supply voltage for integrated circuits. The arrangement preferably does not include thermistor devices that can have low reliability and unpredictability due to aging.

Figure 1:
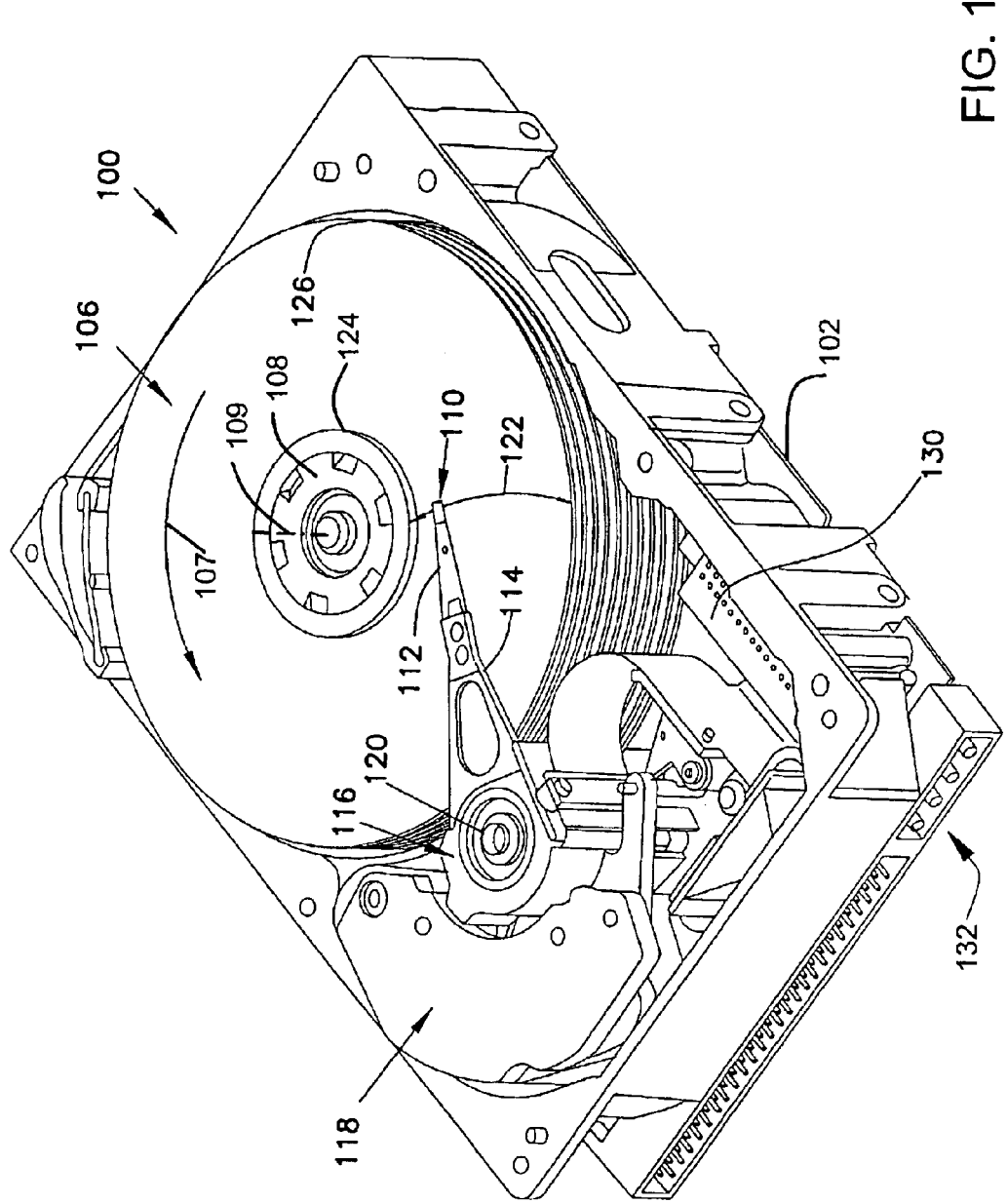
FIG. 1 illustrates an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

The disc drive 100 includes an electrical connector 132 that is arranged for hot plugging the disc drive 100 into the host computer. The term "hot plugging" refers to adding or removing a device (such as drive 100) from a host system while the host system is energized or running. Hot plugging can be implemented across the range of host systems including laptop, desktop and large mainframe computers with multiple disc drive bays as well as various types of embedded control systems. As described in more detail below in connection with examples in FIGS. 2-8, an energization circuit is included with drive 100 to avoid surges and spikes that can adversely affect the drive 100, the host system or both.

Figure 2:
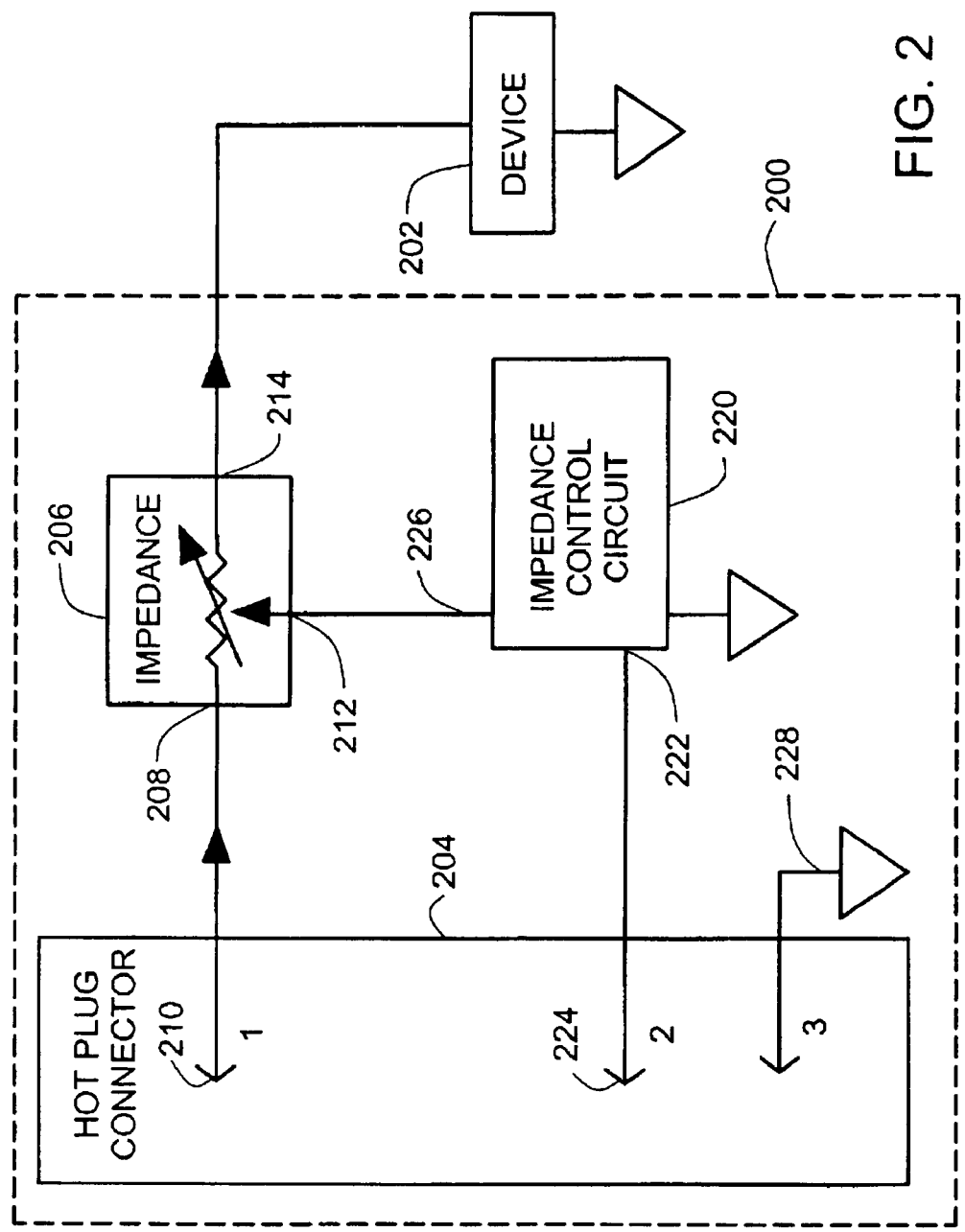
FIG. 2 illustrates a first embodiment of an inrush current controller.

FIG. 2 illustrates a first embodiment of an inrush current controller 200. The inrush current controller 200 controls energization for a device 202. The inrush current controller 200 comprises a connector 204 (comparable to connector 132 in FIG. 1) for hot-plugging the device 202 into a source of energization (not illustrated). The source of energization is typically a host computer system that is arranged for hot plugging and includes power supply contacts, and a logic contact that the host system uses to signal a start-up and a turn-off of the device 202.

The inrush current controller 200 comprises an impedance 206 having a current input 208 that couples to a first contact 210 of the connector 204. The impedance 206 comprises an impedance control input 212, and a current output 214 that couples energization to the device 202. An electrical signal applied to the impedance control input 212 controls a variable impedance that conducts current between the current input 208 and the current output 214. The contact 210 typically mates with a power supply bus in the host system.

The inrush current controller 200 comprises an impedance control circuit 220 with a logic input 222 coupling to a second contact 224 of the connector 204. The second contact 224 mates with a logic output from the host system. The impedance control circuit 220 comprises an impedance control output 226 connected to the impedance control input 212. The impedance control output 226 forces the impedance 206 to an OFF state (high impedance) during a first time interval after hot-plugging. The impedance 206 is effectively an open circuit during the first time interval immediately after hot plugging. The logic input 222 triggers a limited inrush at the current input 208 after the first time interval. A common conductor 228 provides a return path for energization current for the device 202 as well as the inrush current controller 200 to a common bus in the host system.

In a preferred arrangement, the device 202 comprises a data storage device and the source of energization to which the connector 204 connects comprises a host computer system. The impedance control input 212 preferably comprises a control voltage that controls a variable impedance 206 between the current input 208 and the current output 214. The variable impedance is preferably continuously variable over a range of control voltages.

The impedance control circuit 220 ensures that energization is not applied to the device 202 while the hot plug connector 204 is in the process of being mated with the host system. The impedance control circuit 220 also ensures that the energization of the device 202 is controllable by the host system when the host system provides a logic output to the logic input 222. Energization of device 202 can be controlled by the host system to occur in a controlled, repeatable time and voltage sequence defined by the impedance control circuit 220. Details of the impedance control circuit 220 are explained in more detail below by way of an example illustrated in FIG. 3.

Figure 3:
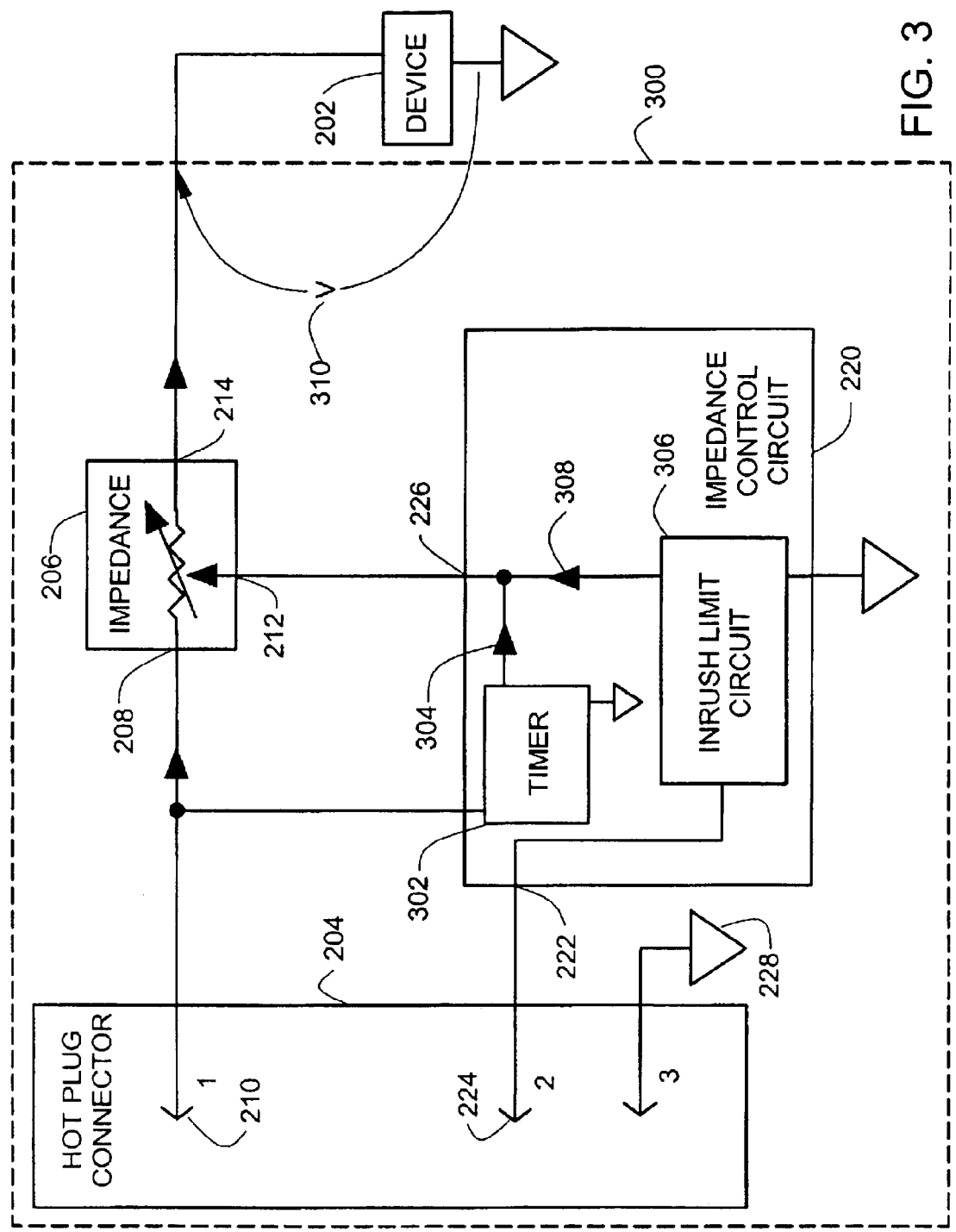
FIG. 3 illustrates a second embodiment of an inrush current controller.

FIG. 3 illustrates a second embodiment of an inrush current controller 300. For brevity, reference numbers are used in FIG. 3 that are the same as reference numbers used in FIG. 2 and identify the same or similar features. Descriptions of these features are not repeated below.

In FIG. 3, an impedance control circuit 220 comprises a timer 302 coupling to the current input 208 and to the impedance control output 226. The timer 302 provides a timer output 304 that forces the impedance 206 to an OFF state (high impedance) during the first time interval. The startup circuit 220 also comprises an inrush current limit circuit 306 that couples to the logic input 222 and to the impedance control output 226. The inrush current limit circuit 306 provides an inrush current limit output 308 that triggers a limited inrush of current into the device 202. The timer output 304 overrides the inrush current limit output 308 to the impedance control output 226 during the first time interval. After the first time interval, the timer output 304 is an open circuit and the impedance control output 226 is controlled by the inrush current limit output 308. The inrush current limit output 308 changes gradually during a turn-on interval (after the first time interval) so that a device voltage 310 rises slowly during a second time interval and preferably has a slew rate defined by an RC time constant. In one illustrative example, the slew rate is less than 12 volts/100 milliseconds. The RC time constant and slew rate can be adjusted to the requirements of the application.

In other respects, the inrush current controller 300 in FIG. 3 is similar to the inrush current controller 200 in FIG. 2. The inrush current controller 300 is explained in more detail below by way of an example illustrated in FIG. 4.

Figure 4:
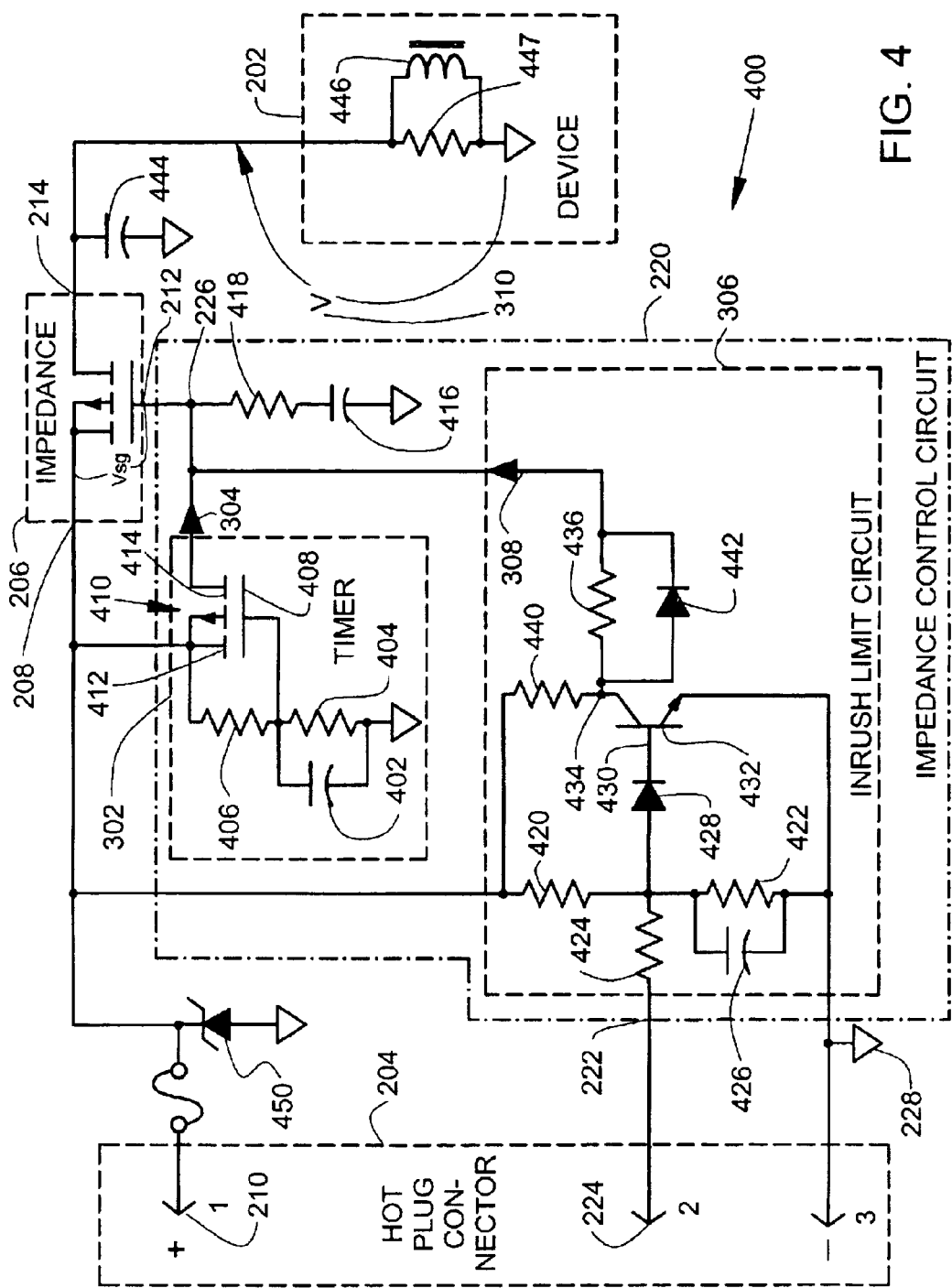
FIG. 4 illustrates a third embodiment of an inrush current controller.

FIG. 4 illustrates a third embodiment of an inrush current controller 400. For brevity, reference numbers are used in FIG. 4 that are the same as reference numbers used in FIG. 3 and identify the same or similar features. Descriptions of these features are not repeated below.

An impedance 206 in FIG. 4 comprises a transistor. In a preferred arrangement, the transistor is an enhancement mode P channel MOSFET such as type SI4923. Other types of transistors can be used as well with appropriate changes to polarities and signal levels. The arrangement can be used for both positive and negative supply voltages. A MOSFET is preferred because the gate of a MOSFET is insulated and does not load impedance control output 226. A PMOS enhancement mode device is preferred to reduce the need for complex bias circuitry to ensure that the device is open circuit when the connector 204 is plugged in.

A timer 302 in FIG. 4 comprises an RC circuit that includes capacitor 402 and resistors 404, 406. When the hot plug connector 204 is plugged into a host system that provide energization, the capacitor 402, which is initially discharged, charges with an RC time constant that is, for example, on the order of 100 milliseconds. Since the capacitor 402 is initially discharged when hot plug connector 204 is plugged into the energization, the bias voltage applied to a gate 408 of P channel MOSFET 410 is initially at ground or zero volts, while voltage applied to a source 412 is a positive supply voltage such as +12 volts. The bias voltage at the gate 408 is negative relative to the source 412, and the FET 410 conducts a current pulse 304 (also called timer output 304) from the source 412 to a drain 414. As the capacitor 402 charges and voltage at gate 408 rises to near a voltage on the source 412, the FET 410 shuts off and stops conducting. The gate 408 is an insulated gate and MOSFET 410 does not drain current from the capacitor 402. When MOSFET 410 is conducting, it has a low impedance between the source 412 and the drain 414. The MOSFET 410 is preferably a type SI4923.

The current pulse 304 has a pulse width (at the start of the first time interval) that is preferably about 20 milliseconds. The current pulse charges a capacitor 416 through a resistor 418. The capacitor 416 and the resistor 418 preferably have an RC time constant of about 0.5 milliseconds. The capacitor 416 is thus fully charged during the preferred first time interval of 20 milliseconds. The timer output 304 overrides the inrush current limit output 308 to the impedance control output 226 during the first time interval. During the first time interval, the impedance 206 is switched off by the timer output 304 regardless of the state of the inrush current limit output 308. After the first time interval, however, the FET 410 is effectively an open circuit and the impedance 206 is controlled by the inrush current limit output 308 which can only slowly discharge the capacitor 416. This arrangement protects the host computer and the device 202 from high inrush currents when the connector 204 is initially plugged in, and also allow for the host to control the timing of the application of energization to the device 202. It will be understood by those skilled in the art that time intervals and slew rates mentioned herein are exemplary, and other time intervals and slew rates can be used, depending on the needs of the application, by adjusting RC time constants.

When the hot plug connector 204 is unplugged from the source of energization (host), charged stored on capacitor 402 discharges through resistor 404. This discharge through resistor 404 automatically resets the timer when the connector is disconnected from the source of energization.

An inrush limit circuit 306 in FIG. 4 comprises an input bias network that includes resistors 420, 422, 424, capacitor 426 and diode 428. The input bias network biases a base 430 of a transistor 432. When logic input 222 is left open circuited (not connected to an external circuit), then current flows from first contact 210 through resistor 420 and diode 428 to provide a bias current to the base 430 and bias the transistor 432 in an ON state. When logic input 222 is connected high, then current flows from the logic input 222 through resistor 424 and diode 428 to provide a bias current to the base 430 and bias the transistor 432 in an ON state. When logic input 222 is connected low, current from resistor 420 drains through resistor 424 to DC common 228, there is not enough bias current available to turn transistor 432 to an ON state, and the transistor 432 is in an OFF state. Transistor 432 is preferably a type 2N3904.

When transistor 432 is off and connector 204 is plugged into a power source, current flows from first contact 210 through a resistor 440 and a diode 442 to turn on the inrush current limit output 308. When the inrush current limit output 308 is turned on (corresponding to a low logic input 222), the inrush current limit output 308 charges capacitor 416 and maintains a high level voltage at impedance control input 212 which keeps the impedance 206 turned off. The charging of capacitor 416 by the inrush current limit output 308 has an RC time constant that is preferably about 0.1 second so that the logic level 222 is able to shut off the impedance 206 in a controlled manner.

When transistor 432 is on (corresponding to an open or high logic input 222), the collector 434 of transistor 432 is at DC common, and the capacitor 416 discharges through resistor 418, resistor 436 and transistor 432. The diode 442 is reverse biased and does not conduct. The discharge of capacitor 416 when the inrush current limit output 308 is off has a time constant that is preferably about 3.5 seconds. The long discharge time constant allows the impedance control input 212 to pass very slowly through a threshold turn-on voltage for the impedance 206. The impedance 206 is continuously variable over a range near its gate threshold voltage and turns on slowly and limits an inrush current between first contact 210 and device capacitance 444. The device voltage 310 preferably rises to its full value over a second time interval that is preferably about 100 milliseconds. For 12 volt energization, this limits the slew rate to a preselected limit, for example, about 12 volts per 100 milliseconds or less. The slew rate is controlled by the values of capacitor 416, resistors 418, 436 and the characteristics of impedance 206.

Figure 7:
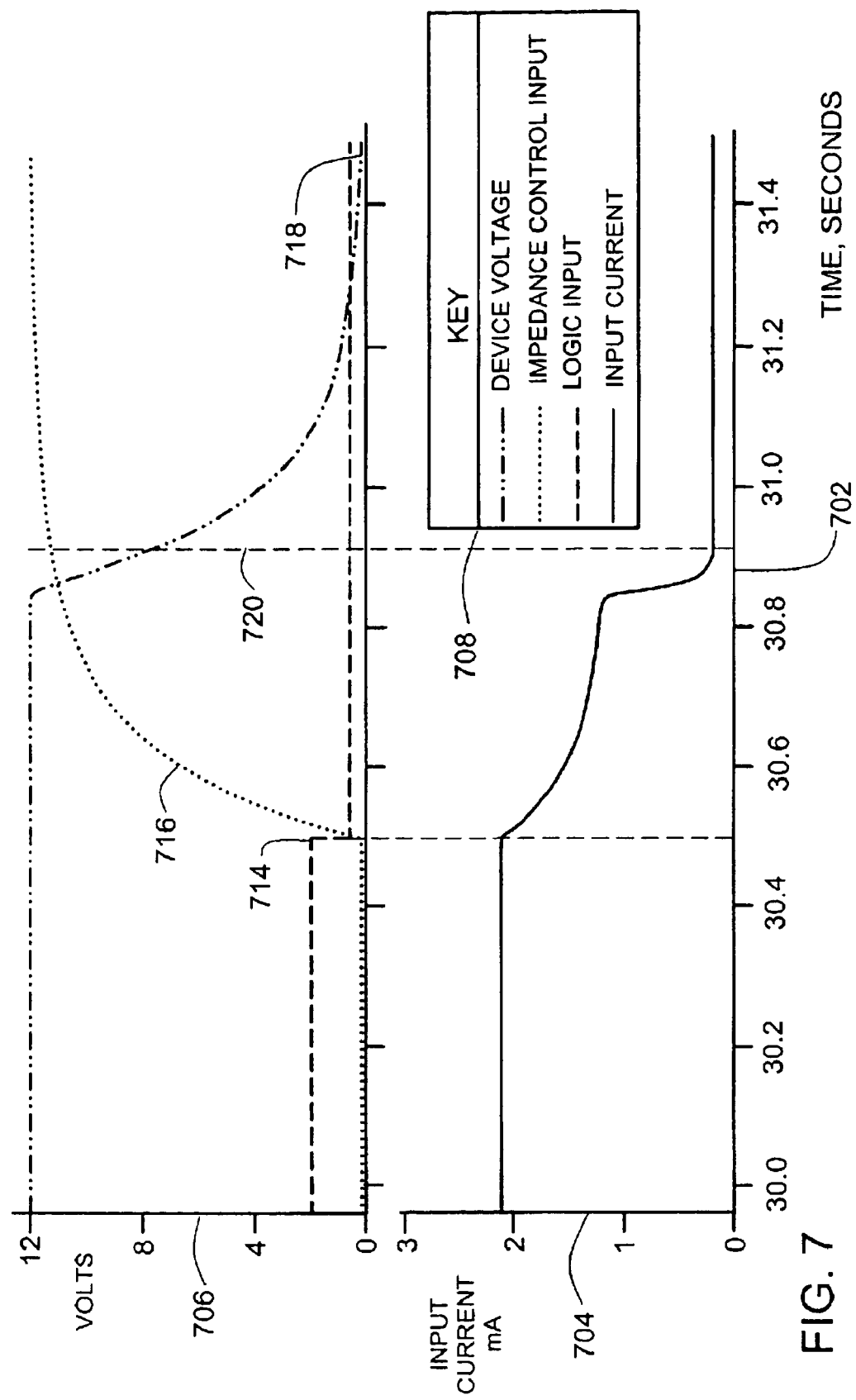
FIG. 7 illustrates a timing diagram of turn-off of an inrush current controller.

The logic input 222 triggers the limited inrush current when the logic input is either an open circuit or at a high level. The logic input 222, when at a low level, shuts off energization to the device 202 in a controlled manner (such as shown in FIG. 7, for example). The host is thus able to actuate the logic input to control energization turn-on and turn-off. If the logic input is not available from the host or inadvertently disconnected, then the impedance control circuit 220 automatically energizes the device 202 after the first time interval. The device 202 may include an inductive component 446 and present a partially inductive impedance. The timed control of turn-on and turn-off by the impedance control circuit 220 helps to avoid inductive spikes form the inductive component 446.

A zener diode 450 provides clamping for overvoltage protection, but is inactive under all normal operating conditions. Unlike prior inrush current controllers that include integrated circuits, the circuit 400 does not require a charge pump (voltage multiplier) to establish a separate higher voltage regulated power supply voltage for power conditioning, and current consumption in circuit 400 is low under steady state conditions.

Figure 5:
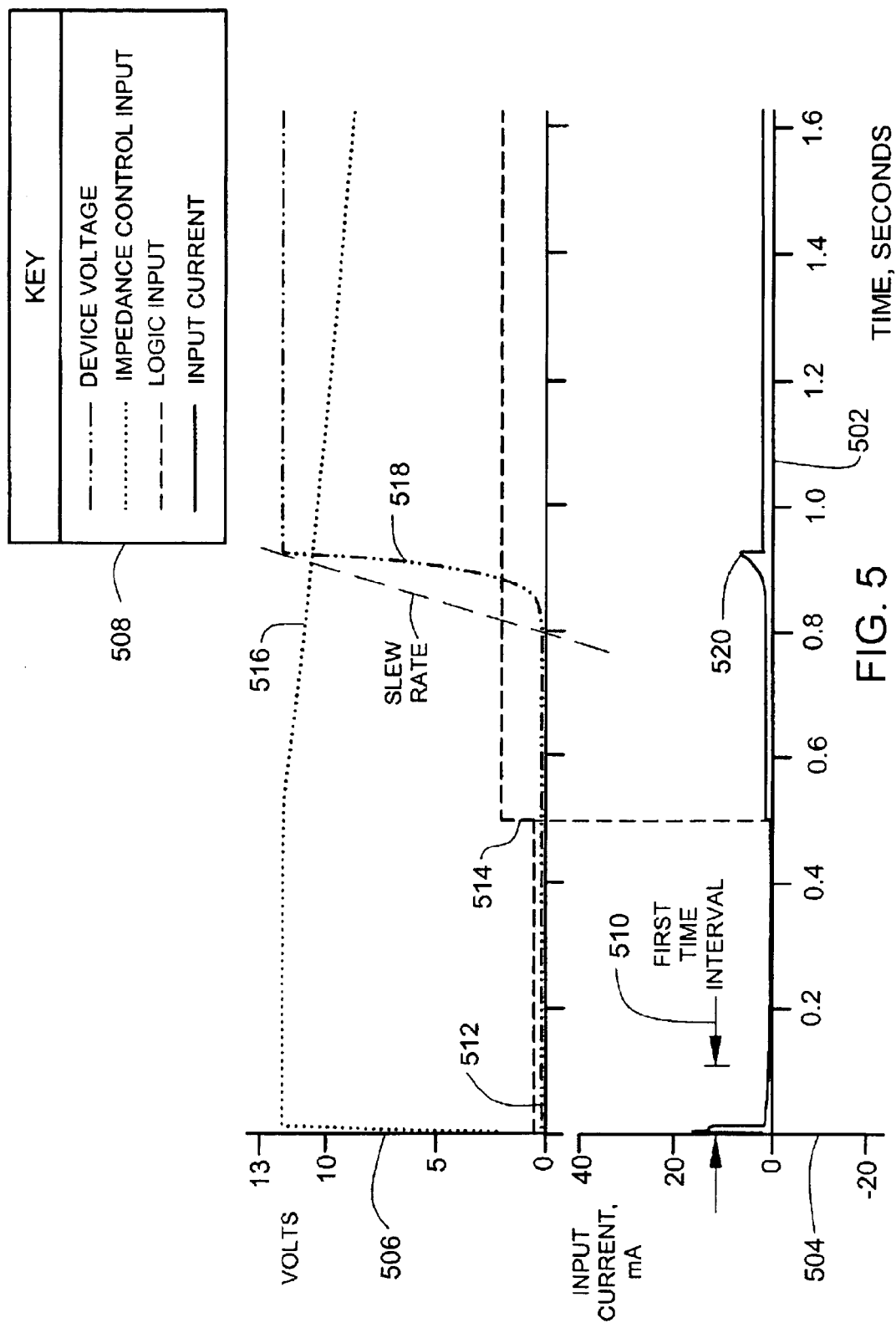
FIG. 5 illustrates a timing diagram of turn-on of an inrush current controller.

FIG. 5 illustrates a computer simulation of a timing diagram of turn-on of the inrush current controller 400 in FIG. 4 when the inrush current controller 400 is hot plugged into a host system. The timing diagram has a horizontal axis 502 that represents time in seconds. The timing diagram has a first vertical axis 504 that represents current in milliamperes. The timing diagram has a second vertical axis 506 that represents various potentials in volts. A key 508 identifies each of the four waveforms shown in the timing diagram.

The timing diagram in FIG. 5 is a turn-on timing diagram and the inrush current controller 400 is hot plugged into a source of energization at time zero. During a first time interval 510, the input current charges the capacitor 416 (FIG. 4) to ensure that the impedance 206 (FIG. 4) is shut off and the device voltage 512 is near zero and no current is provided to the device 202 (via MOSFET 410 and resistor 418 in FIG. 4).

When the host is ready for the device 202 to turn on, the host changes the logic input from low to high at time 514. At time 514, the capacitor 416 (FIG. 4) begins to discharge and voltage at the impedance control input 212 (FIG. 4) begins to decay at 516. As the voltage at the impedance control input 212 slowly passes through a gate threshold voltage of the impedance 206, the impedance 206 slowly turns on and the device voltage rises to 12 volts at 518 over a time interval of about 100 milliseconds. The slow turn on prevents high current turn on spikes. The current at 520 reaches a maximum value of only a few milliamperes.

Figure 6:
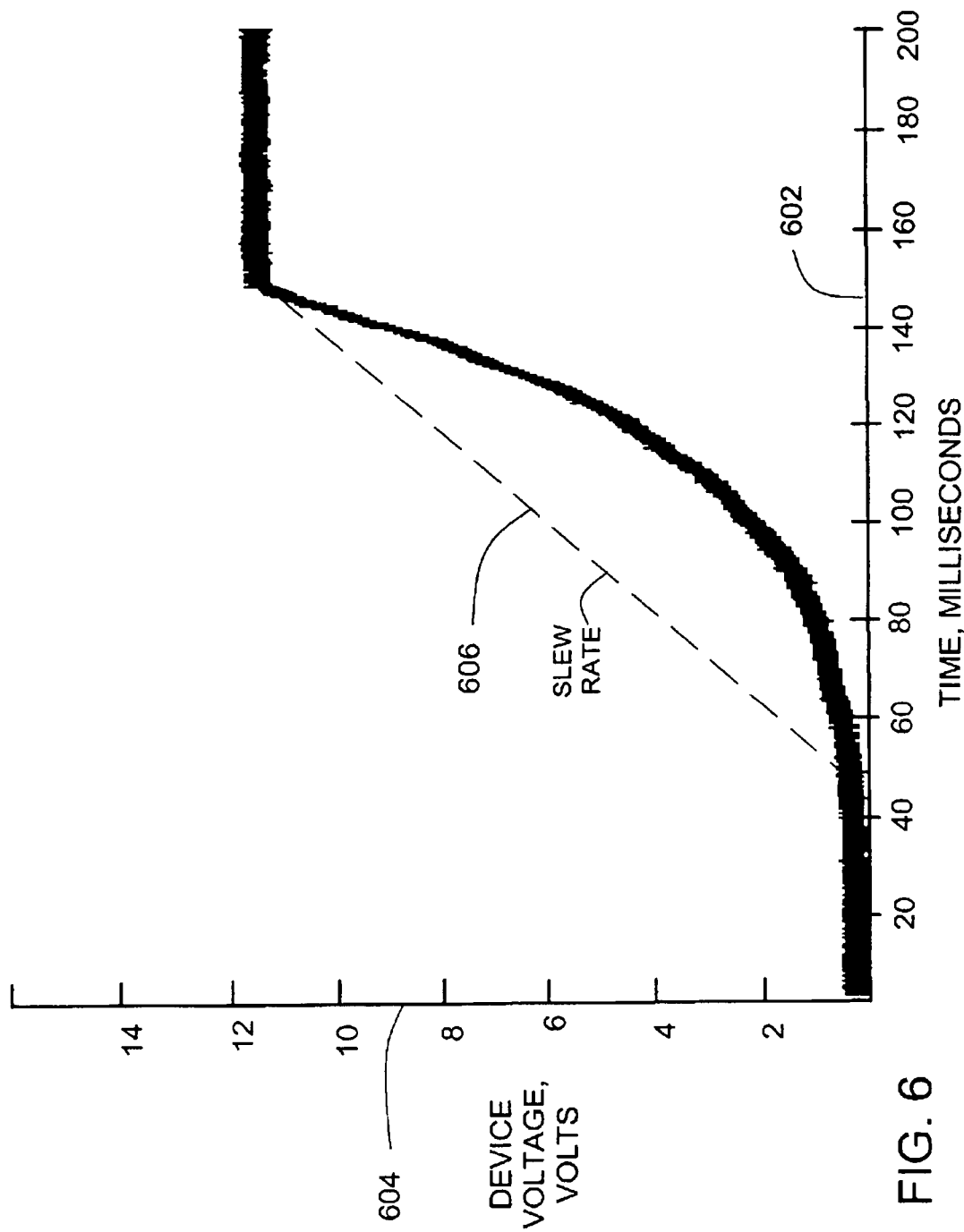
FIG. 6 illustrates a graph of load device voltage as a function of time during turn-on of an inrush current controller.

FIG. 6 illustrates a scope measurement of an expanded graph of load device voltage 310 as a function of time during the transition 518 in FIG. 5. A horizontal axis 602 represents time in milliseconds. A vertical axis 604 represents device voltage in volts. Slew rate is measured along a straight line 606 from start to finish of the turn on transition.

FIG. 7 illustrates a computer simulation of a timing diagram of turn-off of the inrush current controller 400 in FIG. 4 when the host provides a logic output signaling a shut of energization to the device. The timing diagram has a horizontal axis 702 that represents time in seconds. The timing diagram has a first vertical axis 704 that represents current in milliamperes. The timing diagram has a second vertical axis 706 that represents various potentials in volts. A key 708 identifies each of the four waveforms shown in the timing diagram.

The timing diagram in FIG. 7 is a turn-off timing diagram and the inrush current controller 400 has been plugged into a source of energization for some time before the start of the timing diagram. At the start of the timing diagram, the device 202 is energized, impedance 206 is conducting and transistor 410 is off. When the host is ready for the device 202 (FIG. 4) to turn off, the host changes the logic input from high to low at time 714. At time 714, the capacitor 416 (FIG. 4) begins to charge through resistor 418, diode 442 and resistor 440 while the transistor 432 is off. Voltage at the impedance control input 212 (FIG. 4) begins to rise at 716. As the voltage at the impedance control input 212 slowly passes through a gate threshold voltage of the impedance 206, the impedance 206 turns off and the device current falls to zero volts at time 720. Device voltage falls to zero at time 718 over a third time interval of about 100 milliseconds. The third time interval is controlled by the discharge of capacitance 444 through other device elements such inductor 446 and resistor 447. Once the device is off, it can be unplugged from the host without causing power supply transients or inductive spikes to either the device 202 or the host.

Figure 8:
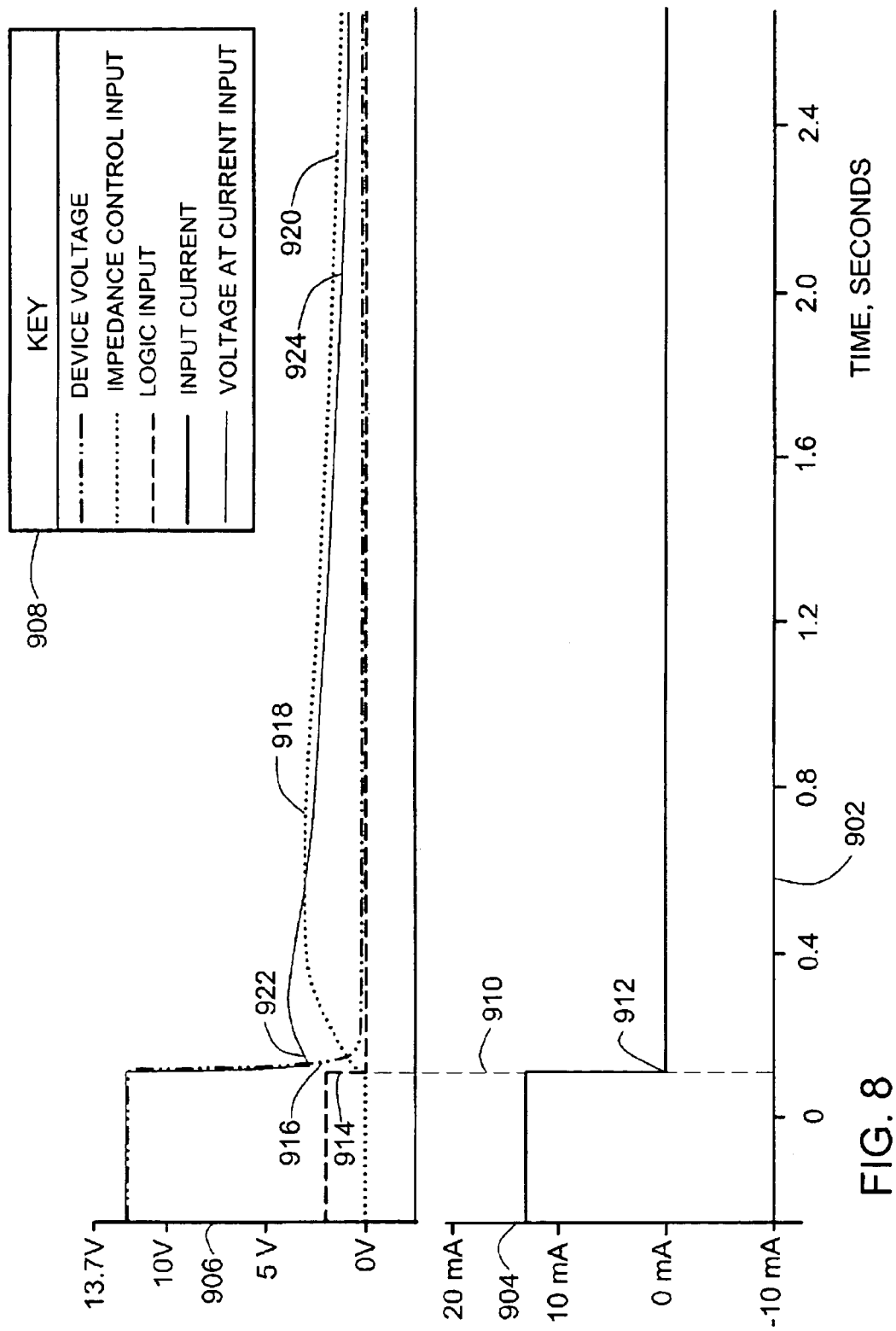
FIG. 8 illustrates a timing diagram of hot un-plugging of an inrush current controller.

FIG. 8 illustrates a computer simulation of a timing diagram of hot unplugging of the inrush current controller 400 (FIG. 4) when the hot plug connector 204 (FIG. 4) is unplugged from a host while the host is energized and the logic input 222 is at a high level. The timing diagram has a horizontal axis 902 that represents time in seconds. The timing diagram has a first vertical axis 904 that represents current in milliamperes. The timing diagram has a second vertical axis 906 that represents various potentials in volts. A key 908 identifies each of the five waveforms shown in the timing diagram. The inrush current controller 400 has been plugged into a source of energization for some time before the start of the timing diagram.

When the hot plug connector 204 is unplugged at time 910, the input current at current input 208 drops to zero mA as indicated at 912, and the logic input drops to a low level as indicated at 914. The current input 208 is free of any power supply bypass capacitors, and so the current through impedance 206 stops abruptly when the connector 204 is unplugged. The capacitor 444 (FIG. 4) that is connected to the current output 214 continues to supply current to the device 202 after the connector is unplugged. The device voltage V decays smoothly to zero as indicated at 916. The device voltage V decays with an RC time constant that is a function of the value of capacitor 444 and the load impedance of the load 202. There are no damaging voltage or current spikes to either the device 202 or the circuit 400.

When the hot plug connector 204 is unplugged, the impedance control input 212 rises above zero volts as indicated at 918 and then slowly decays as indicated at 920 back toward zero volts. A voltage at the current input drops abruptly as indicated 922 and then slowly decays as indicate at 924 back toward zero volts.

Figure 9:
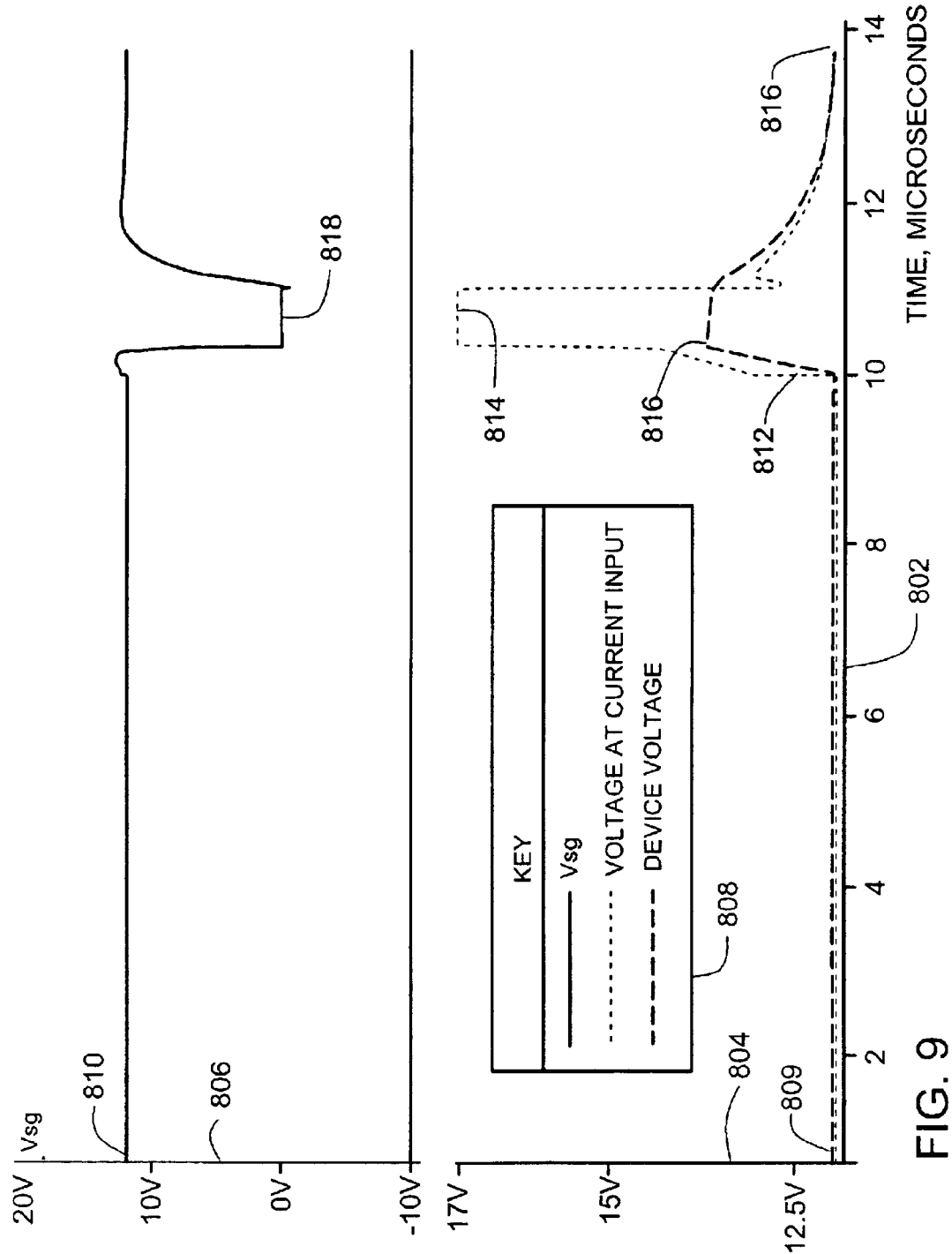
FIG. 9 illustrates a timing diagram during a transient voltage spike at a current input.

FIG. 9 illustrates a computer simulation timing diagram during a transient voltage spike at a current input for the circuit in FIG. 4. The timing diagram has a horizontal axis 802 that represents time in microseconds. The timing diagram has a first vertical axis 804 that represents various potentials in volts. The timing diagram has a second vertical axis 806 that represents a source-to-gate potential for transistor 206 in FIG. 4 in volts. A key 808 identifies each of the four waveforms shown in the timing diagram. The zener clamp 450 was taken out of the circuit model in this simulation to show the clamping effectiveness of the inrush controller.

At the beginning of the timing diagram, the device 202 (FIG. 4) has been energized for a long time and has a stable device voltage of about 12 volts as shown at 809. At the beginning of the timing diagram, the capacitor 416 (FIG. 4) is discharged and a gate-to-source voltage Vgs across the transistor in impedance 206 is about 12 volts as shown at 810. The transistor in impedance 206 is turned ON and has a low impedance. At about 10 microseconds, a transient positive voltage spike begins on the current input 208 (FIG. 4) as shown at 812. The voltage spike on the current input reaches a peak of about 17 volts as shown at 814. The voltage spike lasts a few microseconds and the voltage at the current input 208 settles back to 12 volts at about 14 microseconds as shown at 816. The device 202, however, does not experience a 17 volt spike, but instead experiences a smaller and benign spike increase from 12 volts to only about 13.7 volts as illustrated at 816 due to gate-to-drain capacitance in impedance 206.

The timer 302 protects the device 202 by turning on MOSFET 410 when there is a positive voltage transient a the current input 208. The voltage spike at current input 208 triggers the transistor 410 in the timer 302 to conduct. When transistor 410 is ON, the source-to-gate voltage Vgs for the transistor in impedance 206 goes to zero as shown at 818, and thus the transistor in impedance 206 shuts off, protecting the device 202 from overvoltage. The timer 302 is triggerable by voltage transients at the current input 208, and the timer triggers to protect the device 202 from the transient.

In summary, an inrush current controller (such as 200) for a device (such as 202) has a connector (such as 204) for hot-plugging the device into a source of energization. An impedance (such as 206) has a current input (such as 208) coupled to a first contact (such as 210) of the connector and a current output (such as 214) coupled to the device. The impedance has an impedance control input (such as 212). An impedance control circuit (such as 220) has a logic input (such as 222) coupling to a second contact (such as 224) of the connector. The impedance control circuit has an impedance control output (such as 226) connected to the impedance control input. The impedance control output forces the impedance OFF during a first time interval after hot-plugging. The logic input triggers a limited inrush at the current input after the first time interval.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the inrush current controller while maintaining substantially the same functionality without departing from the scope of the present invention. In addition, although the preferred embodiment described herein is directed to an energization system for a disc drive, it will be appreciated by those skilled in the art that the teachings of the present invention can be applied to energization systems for hot plugging other types of devices, without departing from the scope of the present invention.

What is claimed is:
1. A controller for a device, the controller comprising:
 a connector for plugging the device into a source of energization and unplugging the device from the source of energization, wherein the connector comprises:
  a first contact for connecting to a first power supply contact of the source;
  a second contact for connecting to a logic output from the source; and
  a third contact for connecting to a second power supply contact of the source;

an impedance having a current input that couples to the first contact of the connector, an impedance control input, and a current output coupling to the device; and an impedance control circuit comprising:
  a first timer;
  a logic input coupling to the second contact of the connector; and
  an impedance control output connected to the impedance control input, the impedance control output forcing the impedance OFF during a first time interval controlled by the first timer which is triggered by the device being plugged into the source of energization, and the logic output from the source enabling a limited inrush at the current input during a second time interval controlled by a second timer.

2. The controller of claim 1 wherein the device comprises a data storage device and the source of energization comprises a host computer system.

3. The controller of claim 1 wherein the impedance is variable as a function of the control input.

4. The controller of claim 1 further comprising:
  the first timer coupled to the current input and the impedance control output, the first timer comprising a first timer output that forces the impedance OFF during the first time interval; and
  a current limit circuit coupled to the logic input and the impedance control output, the current limit circuit comprising a current limit output coupled to the impedance control output and controlled by the second timer.

5. The controller of claim 4 wherein the first timer output overrides the current limit output to the impedance control output during the first time interval such that the impedance control output forces the impedance OFF independent of the current limit output of the current limit circuit.

6. The controller of claim 5 wherein the first timer output is an open circuit during the second time interval such that the first timer output does not override the current limit output of the current limit circuit.

7. The controller of claim 4 wherein the current limit output gradually changes the impedance control output during the second time interval so that a voltage output of the impedance has a slew rate that does not exceed 12 volts per 100 milliseconds.

8. The controller of claim 7 wherein the device has an impedance that is partially inductive.

9. The controller of claim 4 wherein the first timer resets automatically when the connector is disconnected from the source of energization.

10. The controller of claim 4 wherein the first timer is triggerable by voltage transients at the current input.

11. The controller of claim 1 wherein the impedance control output triggers the limited inrush when the logic input is open circuit, and wherein the impedance control output triggers the limited inrush when the logic input is at a high level.

12. The controller of claim 1 wherein the impedance comprises a transistor.

13. A controller for a device, the controller comprising:
  a connector configured to connect the device to a power source, wherein the connector comprises:
    a first contact for connecting to a first power supply contact of the power source; and
    a second contact for connecting to a logic output connection of the power source; and a third contact for connecting to a second power supply contact of the power source;
  an impedance component having a current input coupled to the first contact of the connector, an impedance control input, and a current output coupled to the device; and
  an impedance control circuit comprising:
    an impedance control output coupled to the impedance control input;
    a first timer coupled to the current input and the impedance control output, wherein the impedance control circuit is configured to enable the impedance control output to force the impedance component to an OFF state during a first time interval controlled by the first timer, wherein the first timer is enabled when a connection is made between the connector and the power source; and
    a logic input coupled to the second contact of the connector, wherein the impedance control circuit enables a limited amount of current at the current input based on the logic output during a second time interval.

14. The controller of claim 13, wherein the impedance control circuit further comprises:
  a current limit circuit coupled to the logic input and the impedance control output, wherein the current limit circuit is configured to enable the impedance control output to control the impedance component to provide the limited amount of current at the current input during the second time interval such that a voltage of the device has a slew rate that does not exceed a preselected limit, wherein the second time interval is controlled by a second timer.

15. The controller of claim 13, wherein the first timer is enabled by the device being physically connected to the power source, which forces the impedance component OFF during the first time interval.

16. The controller of claim 13, wherein impedance component includes a variable impedance, and wherein the impedance control output is coupled to the impedance control input for controlling the variable impedance.

17. The controller of claim 16, wherein the impedance control circuit comprises:
  a current limit circuit coupled to the logic input, the current limit circuit including a current limit output coupled to the impedance control output such that the impedance control output is configured to control the variable impedance based on the logic input, wherein the first timer includes a first timer output configured to override the current limit output such that the impedance control output forces the impedance OFF during the first time interval independent of the current limit output.

18. The controller of claim 13, wherein the device comprises a data storage device and the source of energization comprises a host computer system.

19. The controller of claim 13, wherein the first timer is configured to be enabled by voltage transients at the current input, and wherein the first timer is configured to automatically reset when the connector is disconnected from the power source.

20. A controller for a device, the controller comprising:
  a connector for plugging the device into a source of energization and unplugging the device from the source of energization, wherein the connector comprises:
    a first contact for connecting to a first power supply contact of the source;
    a second contact for connecting to a logic output from the source; and
    a third contact for connecting to a second power supply contact of the source;

an impedance component having a current input coupled to the first contact of the connector, an impedance control input, and a current output coupled to the device; and an impedance control circuit comprising:

an impedance control output connected to the impedance control input;

a first timer configured to force the impedance OFF during a first time interval controlled by the first timer;

a second timer configured to provide a current limiting output during a second time interval; and a current limiting circuit coupled to the logic input and the impedance control output, wherein the current limiting circuit is configured to enable, via the impedance control output, a limited current output from the impedance component to the device during the second time interval based on the second timer, wherein the current limiting circuit is configured to gradually change the impedance control output such that a voltage of the device has a slew rate that does not exceed a predetermined limit during the second time interval, and wherein the current limiting circuit is configured to gradually change the impedance control output based on the logic output from the source.

21. The controller of claim 20, wherein the predetermined limit is 12 volts per 100 milliseconds.

22. The controller of claim 20, wherein the first timer is coupled to the current input and the impedance control output.

23. The controller of claim 20, wherein the first timer is enabled by detecting a new power source connection from the source of energization, and wherein the first timer is configured to force the impedance component OFF during the first time interval in response to detecting the new power source connection.

24. The controller of claim 20, wherein the first timer is configured to be triggered by voltage transients at the current input, and wherein the first timer is configured to automatically reset when the connector is disconnected from the source of energization.

25. The controller of claim 20, wherein the impedance component includes a variable impedance, and wherein the impedance control output is coupled to the impedance control input for controlling the variable impedance.

* * * * *